United States Patent
Assh

[11] Patent Number: 5,193,063
[45] Date of Patent: Mar. 9, 1993

[54] VEHICLE AXLE CONTROL SYSTEM

[76] Inventor: Daniel Assh, 1155 Turnbull, Quebec, P.Q., Canada, G1R 5G3

[21] Appl. No.: 518,718

[22] Filed: May 4, 1990

Related U.S. Application Data

[63] Continuation-in-part of Ser. No. 383,012, Jul. 21, 1989, Pat. No. 5,025,877.

[51] Int. Cl.$^5$ .............................................. B62D 61/12
[52] U.S. Cl. ............................ 364/424.05; 180/24.02; 180/209; 280/704
[58] Field of Search ....................... 364/424.05, 567; 180/24.02, 209, 290; 280/407, 704, 405.1, 680, 682, DIG. 1

[56] References Cited

U.S. PATENT DOCUMENTS

| | | | |
|---|---|---|---|
| 3,877,715 | 4/1975 | Thayer et al. | 180/24.02 |
| 4,284,156 | 8/1981 | Cartensen et al. | 180/24.02 |
| 4,630,227 | 12/1986 | Hagenbuch | 364/567 |
| 4,684,142 | 8/1987 | Christenson | 180/24.02 |
| 4,700,968 | 10/1987 | Cherry | 280/704 |
| 4,789,038 | 12/1988 | Nguyen et al. | 180/24.02 |
| 4,845,648 | 7/1989 | Hagenbuch | 364/567 |
| 4,854,407 | 8/1989 | Wagner | 280/407 |
| 4,854,409 | 8/1989 | Hillebrand et al. | 180/24.02 |
| 4,944,526 | 7/1990 | Eberling | 280/704 |
| 5,025,877 | 6/1991 | Assh | 180/24.02 |

*Primary Examiner*—Parshotam S. Lall
*Assistant Examiner*—Collin W. Park
*Attorney, Agent, or Firm*—David French

[57] ABSTRACT

A control system for a liftable auxiliary axle samples axle load measurements, and responds with adjustments based on an average value for axle load taken over a number of samples. Further features provide the system with verification and fail-safe procedures, as well as protection against operator subversion.

24 Claims, 8 Drawing Sheets

WEIGHT MEASUREMENT SYSTEM

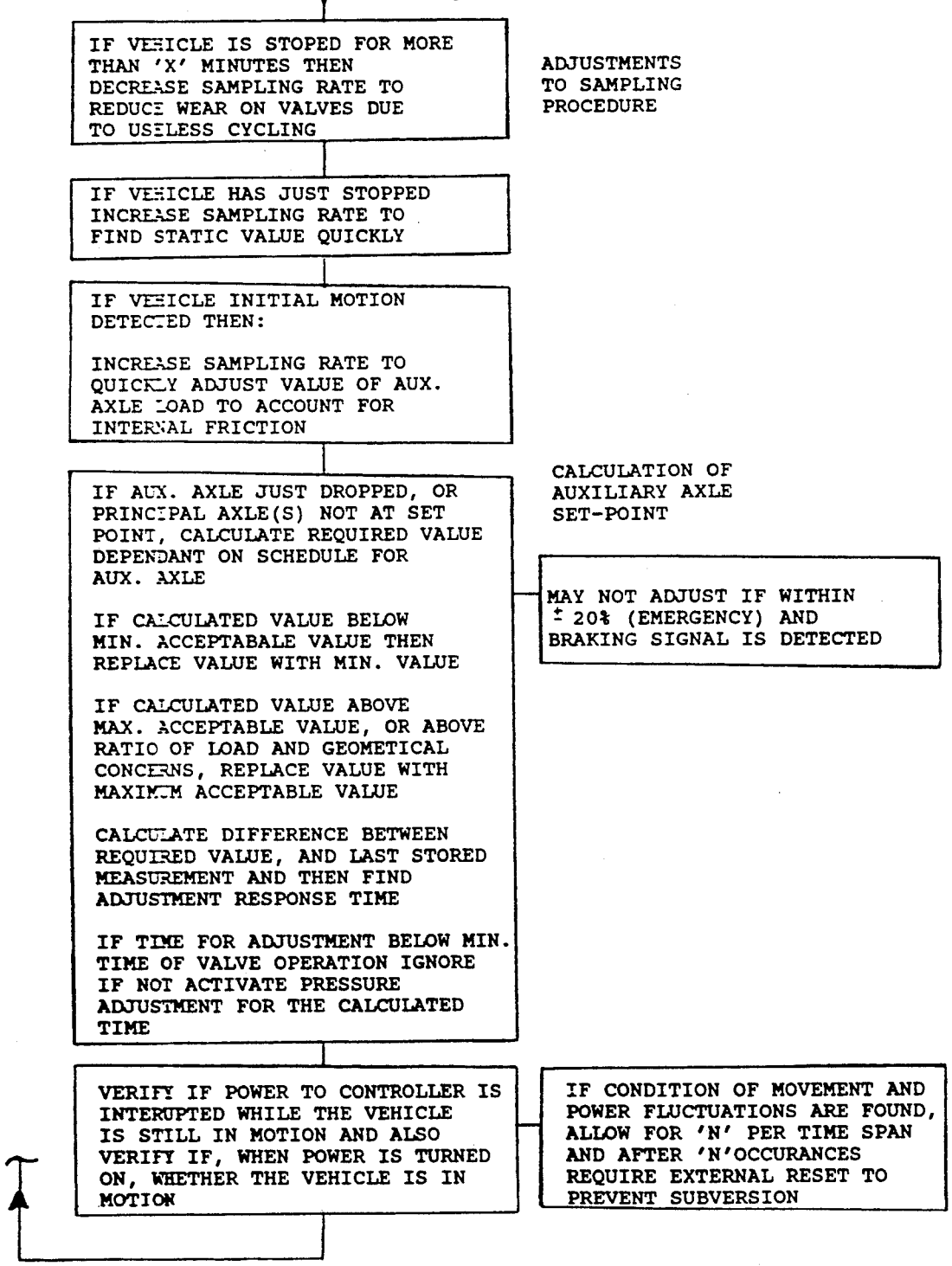

VEHICLE AXLE CONTROL SYSTEM

This application is a continuation-in-part of application Ser. No. 383,012 field Jul. 21, 1989, issued as U.S. Pat. No. 5,025,877 on Jun. 25, 1991.

FIELD OF THE INVENTION

This invention relates to a vehicle suspension system for vehicle that is provided with an optionally deployable auxiliary axle. More specifically, it relates to trucks and trailers wherein it is desired to control automatically both the lowering of an auxiliary axle, and the amount of load carried by that auxiliary axle.

BACKGROUND TO THE INVENTION

There is a limit to the axis load that can be permitted for highway vehicles if damage to the highway surface is to be minimized. Damage to a highway as a function of axle weight rises rapidly, once a certain load point has been passed. Government authorities closely monitor, and fine heavily, trucks that exceed these axle load limits.

The concept of an auxiliary axle that may be raised or lowered has been introduced to provide transport vehicles with a means to reduce the axle load on other axles when the critical load limit is exceeded. A disadvantage of such auxiliary axles is that due to their centrally located position on the truck body, they greatly reduce steerability when deployed with an inappropriate axle load. This is particularly true when the centrally located auxiliary axle is heavily loaded.

The loading of truck axles will vary while a truck is in motion. This can arise from a variety of conditions including wind, the gradient of hill or radius of a turn, whether the vehicle is accelerating or braking and from the shifting of cargo being carried. Thus, while a certain axle weight may be registered at a roadside scale, the actual axle load may increase over that limit, once the vehicle is in motion. These factors have given rise to systems for actually varying the load carried by an auxiliary axle, while the vehicle is in motion.

In addition to these listed factors affecting axle load the unevenness of the road surface, in terms of bumps and pot holes, can produced major transient excursions in axle loads.

A further reason for providing an auxiliary axle, and for providing a means for varying the load carried by an auxiliary axle, is that load limits may change passing from one jurisdiction to another, or when changing from a primary to a secondary road.

A problem that exists with systems designed to control the deployment and loading of auxiliary axles is that they may be bypassed by unconscientious operators who wish to carry loads that exceed proper load limits without the auxiliary axle deployed. They may choose to do this in order to improve the driveability of their vehicle in slippier conditions, to improve the ride, or on the theory that it will save tire wear.

At the same time, there are circumstances where it it would be reasonable to raise an auxiliary axle even through the maximum axle load for the remaining axles is exceeded. These include the cases where it is desired to operate a vehicle in reverse, of where it is necessary to pass the vehicle at low speed through a very tight radius turn.

Thus any sophisticated control system for the deployment of an auxiliary axle should provide both for security against evasion of the system, and for exceptions when intervention of the control system may be suspended.

PRIOR ART

Systems have been described to provide transport vehicles with an auxiliary liftable axle that may be retracted or lower automatically, according to whether the vehicle requires supplementary load-carrying capacity: U.S. Pat. No. 4,700,968 to Cherry.

It has also been proposed to control the weight borne by an axle on a vehicle by increasing or decreasing the pressure in an air-spring associated with an auxiliary axle on the vehicle—U.S. Pat. No. 4,789,038 to Nguyen. It has further been proposed to sense the load condition on a principal axle and to automatically cause the auxiliary axle to be lifted or deployed in accordance with predetermined load criteria for the principal axle: U.S. Pat. No. 4,284,165 to Carstensen et al and U.S. Pat. No. 4,854,409 to Hillbrand.

In these patents, recognition is given to the consideration that the automatic deployment of the scheduled loading of an auxiliary axle should not be responsive to short-term transients. Such transients, as mentioned previously, are always present when a vehicle is in motion.

The range in variations in axle loading associated with such transients becomes more substantial at higher vehicle speeds. Unnecessary response to transient load variations can impose a heavy toll on valves and control components. Accordingly, the ability to discriminate between such transients and true persistent changes in axle loads is a critical requirement for any auxiliary axle control system.

This problem, in the case of controlling axle loading, was met in Nguyen by providing a response "dead-zone" for axle loading within which intervention by the control system is suspended. Such a non-response dead-zone necessarily requires that the vehicle be permitted to operate with less than optimal axle loading within the boundaries of the dead-zone. Nevertheless, extreme transient excursions outside the dead-zone, as caused by a major pot-hole on a road surface, will cause such a system to commence adjustments to the loading of the auxiliary axle in-appropriately. The result is the wasteful and wearing cycling of the control system in which the system initiates an unnecessary change to auxiliary axle loading.

The use of a broad dead-zone to avoid cycling imposes a serious penalty on the carried since it prevents the vehicle from being used to its maximum potential payload under governmental axle load limits.

The problem of cycling in the deployment of an axle may also be addressed by provision of a delay mechanism that requires an overload condition to persist, outside a predetermined threshold, for a predetermined period of time before the auxiliary axle is deployed. However, such a delay system inherently fails to deploy the auxiliary axle until the load on the principal axle persistently lies outside the threshold (for lowering the auxiliary axle) for more than the delay period. Such a system is blind to oscillating loads that dip below the threshold within the delay period. Accordingly, the system is blind to fundamental loading changes to the extent of the amplitude of the oscillations. This can result in the failure of the auxiliary axle to deploy even though a principal axle is overloaded. Alternately, the vehicle has to be operated below its maximum capacity to accommodate the defacto dead-zone that is created.

The present invention addresses these problems. The present invention also embodies as additional, optional features a series of control functions that both provide a driver with flexibility in the deployment of the auxiliary axle and protect against the illegitimate subversion of the control system.

SUMMARY OF THE INVENTION

According to the invention in its broadest aspect, the control system for deploying and loading an auxiliary axle, or for continuously adjusting the loading of an auxiliary axle, responds to a average of samples of the measured load on the principal axle, or axles, from which axle load is being sensed. Such a system is able to operate without the necessity of providing a broad, non-response "dead-zone" in order to avoid unnecessary responses and cycling.

In accordance with a further feature of the invention, measurements are obtained, based in multiple sets of samples, and then compared to stored values obtained from prior samples. The results found are then used to verify that suspension components are responding to signals from the control system, and fail-safe reactions are implemented where correct responses by the vehicle suspension are not verified.

By a further feature of the invention, where certain preset limits for axle load conditions are passed, the control system ceases to act on the standard time-averaging basis, and commences to take corrective action immediately.

By a further feature of the invention when measured axle loads, based on the averaging of readings, exceed certain preset conditions that are indicative of probable control system or suspension system failure, the operation of the auxiliary axle in a substantially loaded condition is suspended. Resumption of normal operation occurs either on a manual "reset" by the operator, or upon the return of measured axle loads within the present conditions.

By a further feature of the invention the vehicle operator can choose between two load allocation schedules to direct the control system to operate on either an axil loading regime in which the auxiliary axle carries only the necessary supplementary weight to prevent overloading of the principal axle(s); or on a regime by which the auxiliary axle shares load equally or proportionally with the principal axle(s).

By a further feature of the invention the length and count in the sampling period used to determine the average of load on the principal axle(s) is varied in accordance with whether the vehicle is moving, has ceased motion for more than a pre-determined period, or has just commenced moving from a previously stationary condition.

By a further feature of the invention the load on a number of axles or vehicle suspension points is measured by detecting cyclically the air pressure of air springs associated with such axles or suspension points, interspersed with samplings of a standard or atmospheric pressure source which are used to recalibrate the pressure sensing transducer.

By a further feature of the invention, corrective adjustments to the load condition of the auxiliary axle are effected by discrete, metered changes to the load controlling components. More particularly, method quantities of air are introduced into or removed from the supporting air springs, in in accordance with amounts calculated to be sufficient to achieve the desired changes.

By a further feature of the invention, if power to the control system is disconnected for more than a predetermined period of time while the vehicle is moving, the system is disabled in order to prevent subversion of the control system.

By a further feature of the invention, the ability of an operator to over-load the control system due to special circumstances is subject to limits based on the speed or motion of the vehicle.

By further feature of the invention the deployment or non-deployment of the auxiliary axil may be effected by the vehicle on the basis of manually over-riding the control system, but subject to limitations that prevent the operator from subverting the general operation of the control system.

By a further feature of the invention, the auxiliary axle can be automatically lifted, (and/or self-steering features locked) so that control by the control system is suspended, when the vehicle is placed in "reverse". Additionally, the axle may be held in a lifted position for some period of time after reverse is disengaged so that in maneuvering in and out of reverse the axle deployment system does not cycle up and down. However, such features are subject to limitations that prevent the operator from subverting the control system when the vehicle is moving for more than a predetermined period of time.

By a further feature of the invention the operation of the control system may be suspended automatically when the carrying out of an auxiliary vehicle function is detected, such as garbage compaction or boom operation; but subject to limitations that apply (when the vehicle is moving) to prevent the operator from subverting the control system.

By a further feature of the invention, the control system suspends implementation of corrective responses (to charged conditions) for a limited period of time, when the brakes are applied. This saves valve wear due to the cycling that would occur from the short term transfer of weight that arises on braking.

These and further features of the invention will be better understood from the description of the preferred embodiments which now follow.

SUMMARY OF THE FIGURES

FIGS. 7a, 7b, and 7c are a flow chart showing the logic employed by the computer controller which is operating in accordance with the invention.

DESCRIPTION OF THE PREFERRED EMBODIMENTS

Figure 1:
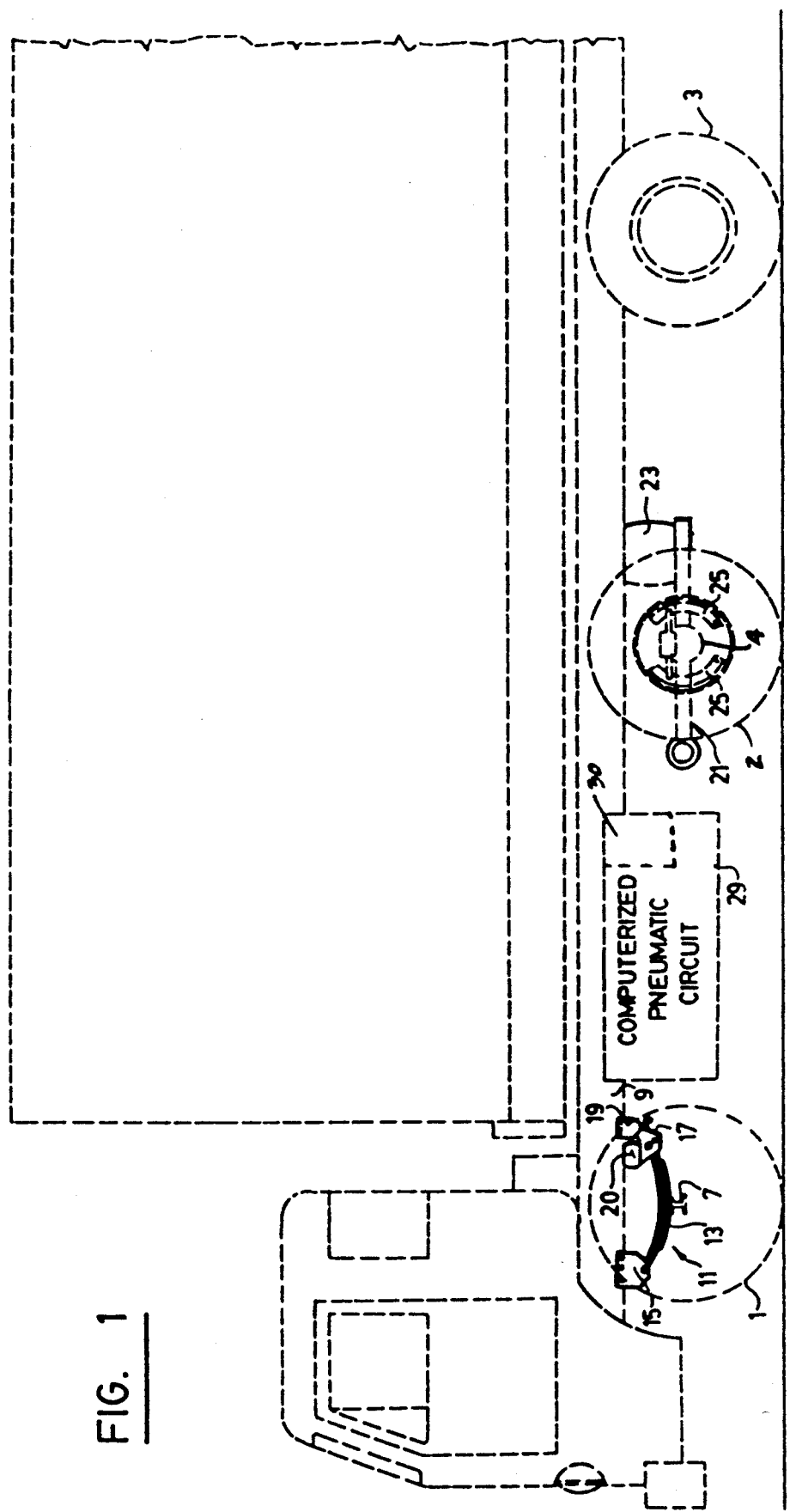
FIG. 1 is a profile view of a truck with a liftable auxiliary axle that is suited to incorporate the invention.

In FIG. 1 a truck having front 1 and rear 3 wheels is depicted. The center wheel 2 is mounted on an auxiliary axle 4 supported by a trailing arm 21 and air spring 23. Brakes 25 are also depicted.

The front axle 7 carries a leaf spring 13 anchored at its front end by a front shackle 15 and at the other end by a rear shackle 19 and shackle arm 17. An air spring 2 between the shackle arm 17 and the frame 9 of the chassis provides support for the overall front axle suspension 11.

Carried on the vehicle is a computer based control system which utilizes a computerized controller 30 to operate the pneumatic circuits, constituting collectively a computerized pneumatic circuit 29.

Figure 2:
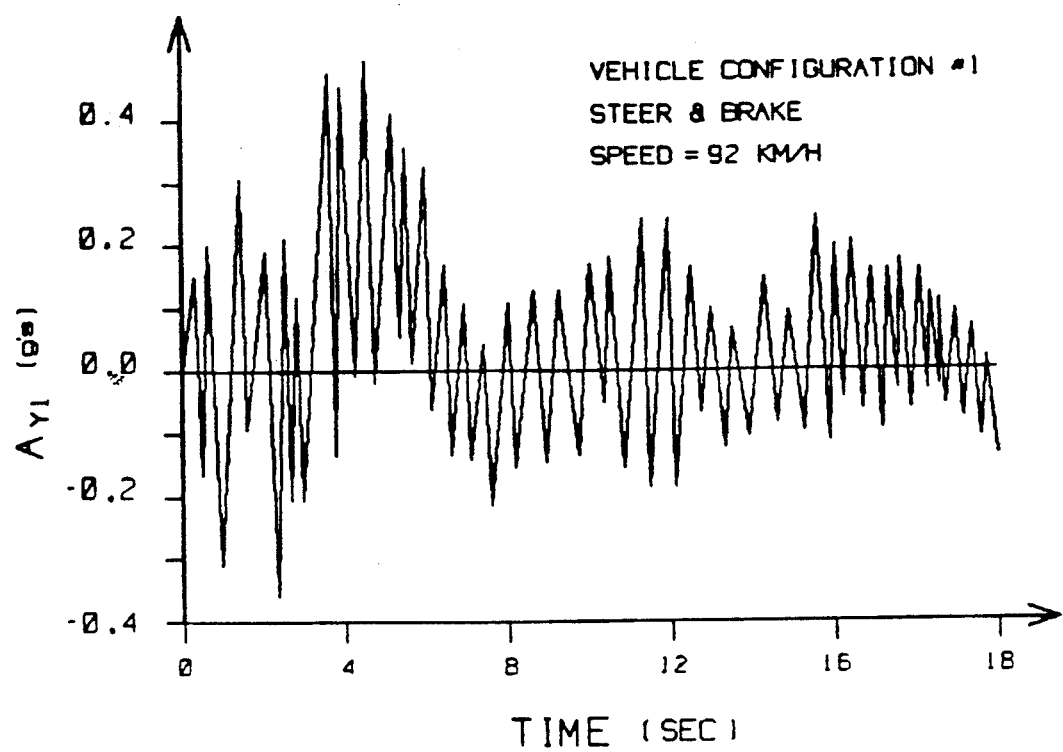
FIG. 2 is a graph of lateral acceleration measured over 20 seconds for a truck travelling at 92 km/hour on an asphalt surface.

Tests have been conducted on the forces experienced by a vehicle, such as that in FIG. 1, when travelling on a finished road surface. FIG. 2 shows a graph of lateral acceleration experienced by an accelerometer mounted in a truck travelling at 92 km/hr up to the 12 second point, and decreasing thereafter. The vertical axis shows lateral acceleration in units of "G"0 or standard gravity. The momentary elevation in the graph at the 4-5 seconds point represents a momentary veering to one side.

The use of an accelerometer allows high frequency spikes a rising from vibration to be detected. As well, the undulating trend of this graph shows lateral sway.

This graph is significant as showing the high degree of variability in loads experienced by a vehicle. While it represents lateral acceleration, it is typical of the load variations experienced by an axle, vertically.

In the preferred embodiment, axle load is determined by taking pressure readings off the air springs (20), (23).

Figure 3:
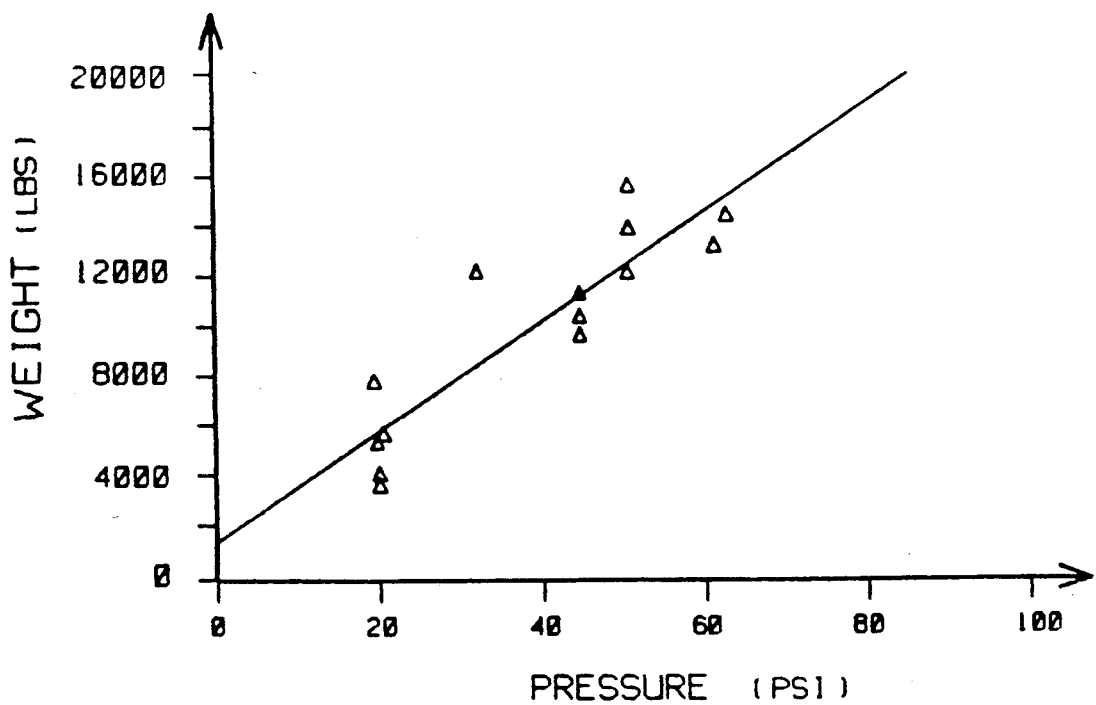
FIG. 3 is a graph showing individual sample readings of air spring pressure, for varying applied loads.

FIG. 3 is a graph showing a series of sample instantaneous readings, based on air spring pressure, corresponding to measured load values on a vehicle moving at a constant speed. The "best-fit" line for increasing load is shown by the diagonal line 901. As is apparent from this graph, there is considerable variability or scatter in the measured values. This variability is due to the motion of the vehicle, other "noise" in the load measuring system, and friction inherent in the suspension systems.

It is because of this variability in load reading that the present invention adopts averaging over a set of sample readings in order to generate a value for the measured load.

Figure 4:
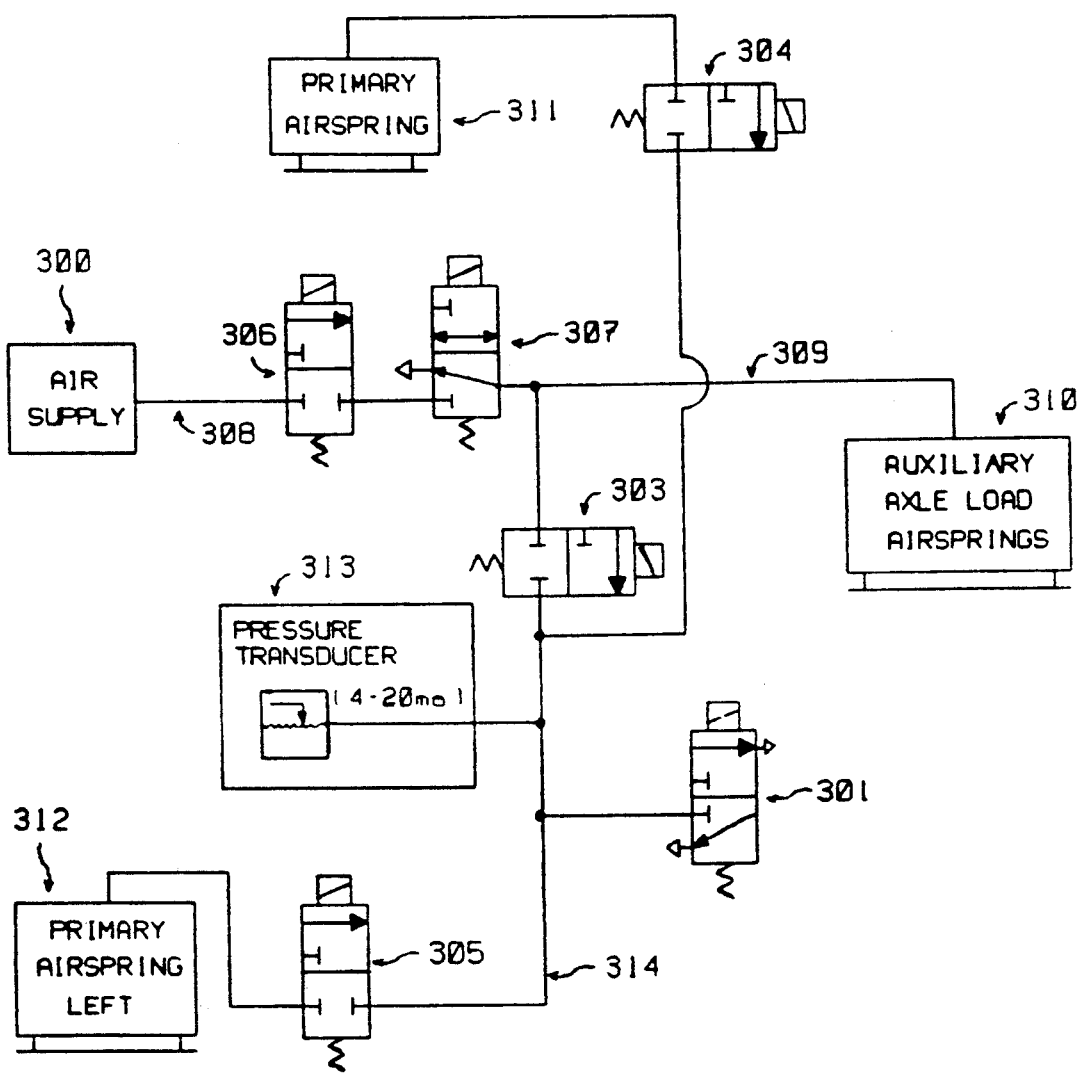
FIG. 4 is a schematic of the air control system for the air springs on the truck of FIG. 1.

The pneumatic circuit for controlling and measuring air pressure in the air spring control system is shown in FIG. 4. In FIG. 4, an air supply 300 supplies air through air line 308 to a primary control valve 306 and then to a bleed valve 307. From there, air is distributed through air lines 309 to the air springs for the auxiliary axle 310. Air pressures in front right and left air springs 311, 312 are adjusted by standard height-control valves (not shown). The function of the air spring valves 303, 304, is to allow the front air springs 311, 312 to be sampled by the pressure transducer 313 through the air lines 314. Valve 301 acts a bleed outlet.

Bleed valve 307 is held closed by current supplied from the control system. In the event of a control system failure to maintain activating current to bleed valve 307, the valve opens and exhausts all air in the system to atmosphere. This disables the auxiliary axle by placing it in an unloaded state, which is a fail-safe condition. By using a 3/2 style valve, the entry of further air from the air source is simultaneously blocked, When bleed valve 307 is found to be ineffective in bleeding air (detected by monitoring for a drop in system pressure when the current to valve 307 is off) then a further valve 306 is placed in a closed condition.

As a further fail-safe condition, valves 303 and 301 assume open state if valve 307 is found to be ineffective. This allows all the air in the auxiliary air spring system to escape to atmosphere by a route alternate to valve 307.

A pressure transducer 313, which may typically be a piezo electric device such as a Motorola MXP series pressure sensor transducer (e.g. model MXP200A), is coupled to the pressure lines 314. By controlling the position of valves 303, 304, 305 the transducer 313 can be sample the pressure at any one of the air springs, 310, 311, 312. The valve 301 allows the transducer 313 to sample atmospheric pressure.

Centralized Load Measurement

A variety of known methods exist for measuring axle load. One means to measure axle load directly is to place a load cell between the axle and its suspension. However, it is inconvenient to expose a load cell to the full shocks and pressure transmitted by the axle to the suspension. An alternate indirect means to measure load is to place a strain gauge on an axle between the wheel and the suspension point. A further means, preferred in the present invention, is to utilize air springs in the suspension, and measure the pressure of air within such springs. The use of air springs is not, however essential to the application of the invention, and the invention may be adapted to any known load measuring system.

When using air spring pressure to measure axle load, the spring should be first tested to determine its load-vs-pressure response curve. This curve, along with corrections for hill gradients, etc., may then be used to generate satisfactorily accurate values for the load on each air spring supported axle from which pressure readings are being taken.

The use of air spring pressure as the parameter for measuring axle load conveniently allows load at a number of axle points to be measured by a single pressure transducer. A simple piezo-electric transducer which produces an electrical voltage which is a function of applied pressure has been found convenient for this purpose. Alternately, devices based on a strain gauge may be used.

Air lines are run from each air springs to be sampled to the single pressure transducer. A valved manifold is used to permit the transducer to sample consecutively the pressure in each of the lines.

For security in ensuring that proper readings are being taken, it is useful to provide a port on the manifold by which the transducer may periodically sample a source of air at standard pressure, usually the atmosphere. This may be used to repeatedly recalibrate the transducer by providing an electrical output which corresponds to this standard value.

A further valuable procedure that may be employed to ensure the reliability of pressure readings is to vent the pressure transducer to the atmosphere between readings. This may be done only momentarily, but for a sufficient period of time to purge the air derived from the last reading. The effect, when the manifold sampling mechanism is operating properly, is to intersperse measured pressure readings from consecutive air springs with a "zero" value reading. By checking for the presence of this interspersed zero-value reading, the fact that air from prior samplings has been purged can be verified.

If this purging procedure is not followed, then the control system receiving an apparent pressure-equivalent signal from the pressure transducer will be blind to a failure by a manifold valve to open. Instead, the transducer will provide, erroneously, a pressure reading based on the air sample of the last prior reading.

The provision of a procedure by which measured pressure readings from consecutive air springs are interspersed with sample readings from a standard pressure source provides a valuable confirmation that the valves within the pressure measuring system are operating correctly. This is a function that may be employed whether or not the control system for the auxiliary axle operates on a sampling basis.

The computerized controller 30 operates the air valves to provide or bleed air into each of the air springs 310, in accordance with the loading requirements for such axles.

Load Distribution Regimes

For a given gross vehicle load, there are a number of criteria that may be applied to establish the preferred distribution or load allocation for individual axles. Such allocations may not usually be fully obtainable. But they may approximated. Further, critical limits that should not be exceeded may be established.

The principal axle (or axles) on a vehicle must have adequate load in order to generate a sufficient cornering force. This is particularly true when the front axle is used to turn a vehicle with multiple rear axles.

When an auxiliary axle is deployed, it is generally done so to ensure that other axles on the vehicle do not exceed their maximum load limits. When the auxiliary axle has a controlled capacity to carry varying degrees of load a choice arises as to the weight distribution regime that is to be adopted.

In one mode, the auxiliary axle may be controlled so that it carries only that amount of weight necessary to bring the known load, or loads, on the monitored axles within their legal limits. This "supplementary" load regime has the advantage of burdening the auxiliary axle with the minimum degree of wear. It also represents a minimal change in the driving response characteristics of the vehicle.

A further regime for allocating the axle weight is to set the auxiliary axle load on a "proportional basis", in proportion to the load on the principal axle, or axles.

Where the proportional ratio is chosen so as to equalize the weight on such axles, government regulations may qualify these axle sets as "tandem" or "tridem" axles etc. and permit higher axle load limits. This can be of major advantage to carriers.

An auxiliary axle may also be operated under a load that is at a proportion other than equality with respect to the principal axle. This may be preferred as when the auxiliary axle is self-steering and may preferably be operated at a ratio of, for example, 40:60.

It is useful, therefore, to allow a driver to choose from a schedule of alternate loading regimes the regime that he prefers.

Determining Suitable Lift And Drop Points

It is useful to project in advance the effect of deploying, or lifting, the auxiliary axle before executing that maneuver.

In determining whether to deploy an auxiliary axle (that is already in a lifted position), the load on the principal axle may be compared to a preselected "drop-point" load value. This value is selected on the basis of consideration of axle load limits, vehicle handling (steering) characteristics, and ride quality. If that drop-point is exceeded, the auxiliary axle should be lowered.

However, once the auxiliary axle is deployed, the load of the principal axle will be reduced by some factor corresponding to the load being borne by the auxiliary axle, taking into account its geometric location.

To prevent "cycling", a predetermined "lift-point" load for the principal axle can be selected such that, if the auxiliary axle were to be lifted, the load on the principal axle will not be returned to above its drop-point.

Figure 6:
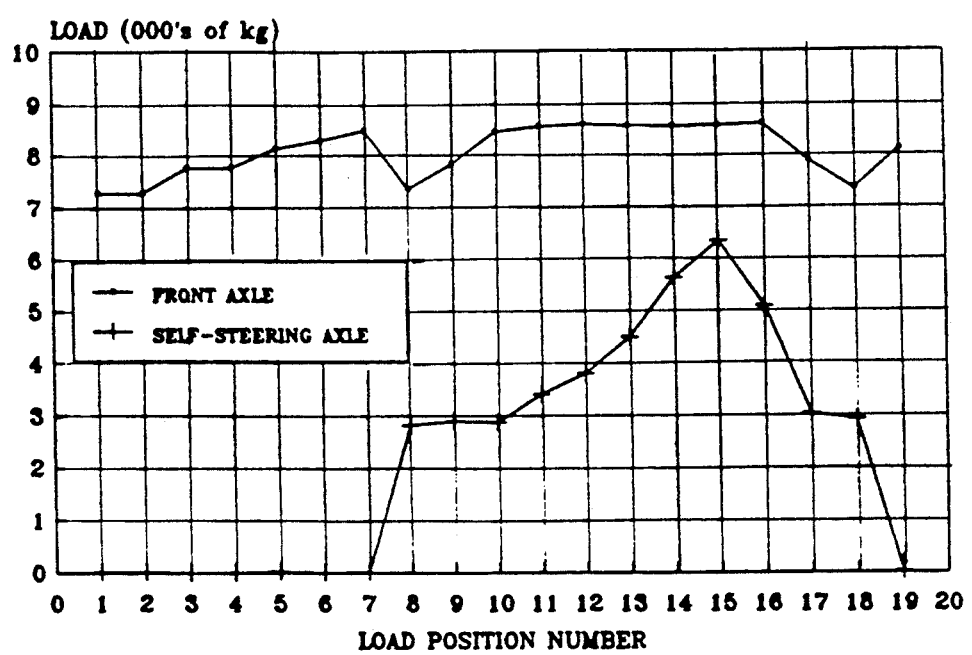
FIG. 6 is a graph showing both the response of a load adjustment system, according to the invention, to a series of increasing loads, followed by a series of decreasing loads, and then by intermittent loads.

This is shown in FIG. 6 which is a graph of the loads on the principal and auxiliary axles as a function of a varying total load for the vehicle. This latter parameter is shown on the "axle" as test or reading numbers.

From reading 0 to 15 is the principal axle was loaded progressively. At reading 7 the principal axle has reached its predetermined drop point and the auxiliary axle is still not deployed. At reading 8 the auxiliary axle has become deployed and loaded to 2900 kg. (its minimum permitted load).

Due to deployment of the auxiliary axle, the load on the principal axle has dropped. Over the next two readings 9, 10 the auxiliary axle maintains its minimum permitted load. If it were lifted at this point the principal axle would be overloaded.

Beyond reading 10, the auxiliary axle absorbs the additional load necessary to maintain the principal axle at its maximum permitted load value. This weight condition for the principal axle is a precisely controlled (within small tolerance limits) using the weight measuring technique of the invention.

From reading 15 to reading 19, the total vehicle load is being reduced. From reading 20 to 24 the system was cycled between controlled and control-suspended states (by using reverse) in order to show the consistency of the control system.

In order to make the decision to either lift or lower the auxiliary axle, measurements of load must be taken off the principal axle; and the load on the auxiliary axle must be either measured or approximated by calculation from the measured load. In doing so, it is important that the fluctuations arising from road irregularities, vehicle vibrations and friction within the suspension be averaged out. By averaging out the random variations in measured axle load a more precise control over the deployment (logic) of the auxiliary axle may be obtained.

In the preferred embodiment, the decision to lift the auxiliary axle is made when the principle axle load is below a minimum lower limit or lift-point and the auxiliary axle is at (or below) that minimum, for two consecutive confirmatory readings; or immediately for a single "emergency" reading of 20% under the minimum. The decision to lower the auxiliary axle is made when the load on the principle axle is above its maximum upper limit or drop-point, based on two consecutive, confirmatory readings; or immediately on a single "emergency" reading of 20% or more over the maximum.

In either case it is necessary to obtain a load measurement from the principle axle. In the case where a supplemental loading regime is being applied, it is further necessary to obtain a measurement of the load on the auxiliary axle before making a decision to lift the auxiliary axle.

When using other than the supplemental regime, the load on the auxiliary axle can be approximated by use of known physical relationships. For example, in a tandem unit in which one of the axles is the principal axle, and one the auxiliary axle, the total load would be approximately equal to twice the load on the primary axle.

A lower limit is placed on the loading of the auxiliary axle to prevent wheel hop, excessive suspension and tire wear and inadequate braking. This is generally accepted practice in the field.

An upper limit may be set based on road wear considerations and government regulatory limits. Since the loading of the auxiliary axle is controllable, it is possible to ensure that this axle, at least, never exceeds an authorized limit. This prevents the auxiliary axle from being required to bear the entire excess load, and distributes such excess load over the remaining axles. Thus when the auxiliary axle is held at its maximum load limit, excess loads are distributed over a remaining number of axles, reducing the pavement damage below that which a single axle would create.

The upper limit for the loading of an auxiliary axle may also be based on drive ability considerations. A limit on the loading of the auxiliary axle may be set in order to provide adequate cornering forces. This limit will depend on vehicle geometry.

Accommodation of Variations in Measured Axle Loads

It is a principal feature of this invention that a system is provided which accommodates, in an improved manner, transients and variations that arise in measured axle loads in controlling the pressure in the air springs 310. This improved performance is achieved by controlling pressure in accordance with a series of samples of measured air pressure taken over time. The series of samples constitute a "sample set" and the time over which samples are taken is identified herein as the "sampling period".

It is important to appreciate that the prior art, by reason of use of direct load measurements, requires the use of a non-response or "dead zone" for determining when to respond to apparent load changes. A dead-zone is used in order to suppress unacceptable cycling of the auxiliary axle control system. This use of direct load measurements and "dead-zone" criteria by the prior art results in less efficient loading of the axles measurements. The present invention provides a continuous response system. The measurement averaging procedure of the invention eventually causes the axle loads on the vehicle to be adjusted closely to their preferred values. Reliance on an inefficient and load-capacity-wasting "dead-zone" is eliminated.

Figure 5:
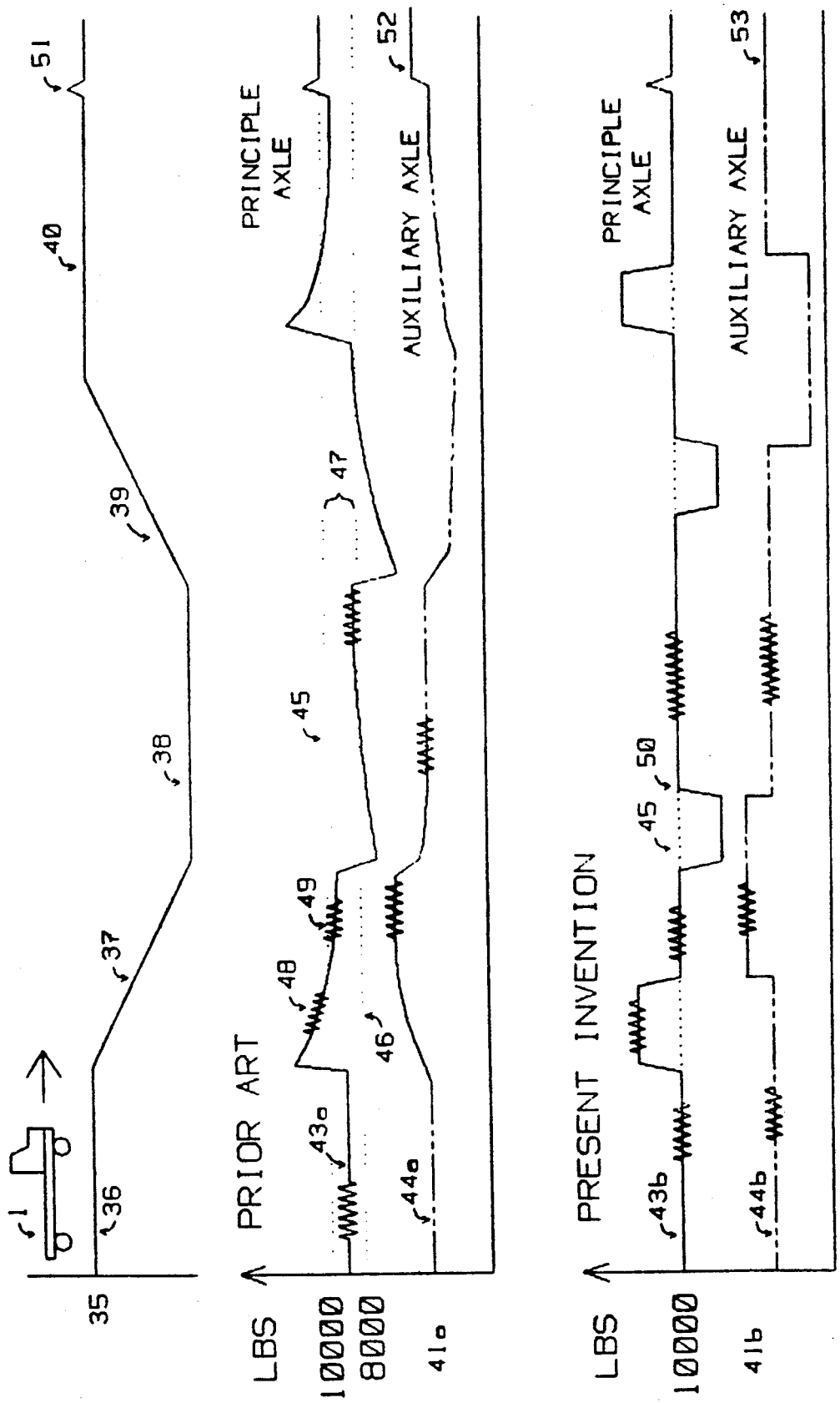
FIG. 5 is a graph showing both the response of a prior art load adjustment system which relies on a "dead-zone" to filter-out transient pressure variation, and the response of the principal and auxiliary axles of the present invention to transient and distinct variations in load.

The benefits of the invention may be seen in FIG. 5.

In FIG. 5 a truck, with the front axles taken as the principal monitored axles, is shown passing along a roadway 35 which has an initial flat portion 36, a descending portion 37, a central flat portion 38, an ascending portion 39, and a terminal flat portion 40.

The upper, and lower graphs 41a, 41b are aligned vertically with the path of the roadway 35 to show corresponding axle loads at each stage. The upper graph 41a shows the response of a "dead-zone" load control system to highway variations; and the lower graph 41b shows the response of a system operating in accordance with the invention.

The upper traces 43a, 43b in graphs 41, 42 show respectively the load on the principle axle. The lower traces 44a, 44b show the load on the auxiliary axle. A hypothetical maximum allowable axle load limit line 45 set at 10,000 in dimensionless units, is indicated on each graph 41a, 41b. The prior art graph 41a shows additionally a lower line 46 at the 8,000 level. The space between this lower line 46 and the load limit 45 represents the dead-zone 47 by which the prior art operates.

For the initial flat portion 36 of the roadway, the prior art vehicle is operating with a principal axle load 43a which is within the dead-zone 47, approximately centered. The variations in loading for which the dead-zone 47 is required are shown in the load curve 43a as being within the dead-zone 47. Therefore, no response in the system occurs.

When the descending portion 37 of the road is reached, weight shifts to the front axle and the load curves 43a, 43b for the principal axles jumps in both cases. Because the measured value of the load on the principal axle is now above the upper load limit 45, both systems respond by increasing the load on the auxiliary axle 44a, 44b. In both cases, the principal axle curve 43a,b returns to the upper load limit 45. However, the prior art response is more gradual to prevent over shooting. The response of the system of the invention is prompt, once the time to produce an average value has passed.

The prior art curve 43a is progressively moved down further into the dead-zone 47 as load transients exceed the upper limit 45. This requires a series of on-off reactions by the air system control valves, causing wear on the valves.

The principal axle curve 43b for the invention returns directly to the maximum load limit 45 and remains there, with the average load precisely at the set-point limit 45.

The auxiliary axle load levels 44a,b, in both cases, rise to accommodate the additional load imposed by the descending roadway 37.

At bottom of the descending roadway 37 the vehicle 1 resumes a level configuration along the lower flat portion 38.

In the case of both the prior art and inventive system, the principle axle experiences a reduction in load. This is apparent in the curves 43a,b. The valves for auxiliary axles are caused by the computer controller 30, to bleed air from the air springs, reducing the load on the auxiliary axles. Again, this occurs over time. At the same time, the loads on the principle axles are increased, and the curves 43a,b for each rise correspondingly.

At this stage the responses of the two systems differ. The system operating according to the invention increases the load on the principal axle until the curve 43a arrives at its "set point", namely the load limit 45 at position 50 after the sampling period has passed.

The prior art system, however, initially restores the load on the principal axle only to the point at the load curve 43a is within the dead-zone 47. Initially, this may be in a region close to the lower limit 46 of the dead-zone 47. But as before, as random excursions in the measured load extend outside the dead-zone 47, over the lower limit 46, the load curve 43a for the auxiliary axle will be progressively displaced upwards. This will associate with a repeated cycling of valves.

Once the prior art system has stabilized, it is important to note that the average load that will be carried by the auxiliary axle will always be somewhere in the center position of the dead-zone 47. On the scale provided, this represents a value of about 8,500-9,500, or up to 15% below the maximum load limit 45 of 10,000.

When the dead-zone is used, as in the prior art, the vehicle must always be loaded beneath its maximum crying capacity. By contrast the system of the invention allows a vehicle to be loaded to its absolute capacity limit.

The balance of the curves 43a,b and 44a,b show the respective responses of the auxiliary and principal axles for each system, as the vehicle mounts the inclined.

One should notice that a large bump 51 has an effect on the prior art auxiliary axle load 44a at point 52. Conversely bump 51 has no effect on the system based on the invention as shown at point 53.

Sampling Systems

In the preferred embodiment sampling sets are taken in groups of 30 samples usually over two to eight seconds. The number of samples and the sampling period may, however, be varied.

The average value of the two most recent past sample sets is stored and then compared to the average value of the most immediate sample set obtained. Any change will show up as a trend.

The presence of a trend in the correct direction is used to verify that the system is responding correctly when changes are being effected. If an indication that an anticipated change is not occurring (confirmed over at a present number of samplings, e.g. 5) the system issues an "error" signal and goes into "Fail Safe" mode where the loading of the auxiliary axle is discontinued.

The criteria for initiating a response are based on a comparison of the stored average value with the most recent average value, averaged together. This value than replaces the earlier stored value.

When the vehicle is stationary a higher sampling, or shortened sample set, rate is adopted for an initial period, typically 3 minutes. This increases the response rate of the system when, for instance, the vehicle stops at a scale. After the initial period has passed, the sampling rate is slowed down by a factor of 5 or 6 to preserve valve life.

Metered Response System

In other systems to control the actual loading of an auxiliary axle, commands are issued to execute changes on the basis that the response of the system is continuously being monitored, and the commands adjusted accordingly. Thus, air may be forced into an air spring while pressure within the spring is being monitored. When the desired pressure condition is detected, the introduction of further air is terminated.

In the application of the present invention, a "metered response" strategy is adopted.

According, to this metered response strategy, when a changed condition required that the air pressure within air springs must be changed, a calculation is made of the amount of air that should be introduced into, or bled from, the system to achieve the desired state. The control valve governing the introduction or release of air is then opened, on a predetermined basis, only from the appropriate period to achieve this result. Alternately, where a pressure regulator valve is used, the pressure regulator valve is set to the estimated, desired pressure.

This system allows for the rapid, approximate adjustment of the pressure in the air springs. Where a continuous feed-back system in used, the rate of change of pressure must be limited to prevent over-shooting.

Used in conjunction with the sample averaging system, described herein, this metered response mechanism avoids responding unnecessarily to transients arising from road irregularities. It also quickly reaches its desired set point without overshooting and cycling, and allows a quick response time, especially for emergency conditions. This feature is not present in continuous response systems.

This arrangement avoids the need for continuous feed-back and allows the pressure monitoring system to be applied to other components while the compensatory adjustment to air pressure is being effected. This feature suits, on a complementary basis, the use of a single pressure transducer (which is an expensive component) in conjunction with an alternate sample system for monitory the pressure states in each air spring.

Thus, very small adjustments may be effected by short-period openings of the supply or bleed valve, (or pressure regulator adjustments) without the necessity of monitoring exclusively the pressure in the air bag that is being adjusted. If the period between pressure samplings exceeds the adjustment period, the air pressure in the air spring rests in at a static, first-adjusted level, until it is determined that a further adjustment is required. If the pressure measuring system were to fail, a dangerous over-pressure condition will not develop.

Choice of Principal Axle

Throughout, this disclosure the "principal axle" is used to mean the axle, or group of axles, which are monitored for load and are thereby used to govern the decisions taken with respect to the auxiliary axle. It is preferable to utilize all direct load information available, and to use a combination of axles as a "principal axle" where measurements are available from each axle in the combination.

By reason of geometry, the axles on the same side of the center of mass or gravity of the vehicle that the auxiliary axle is on will be most affected by the deployment of the auxiliary axle. Customarily the auxiliary axle is placed between the front and rear axles, at a position near the center of gravity, where its deployment will affect the load on both the front and rear axles. When the auxiliary axle is forward of the centre of gravity, which is typical, it will have a greater effect on the front or steering axles. When an auxiliary axle in this location is deployed, care must be taken not to decrease the axle weight on the principal axle below the minimum necessary for adequate cornering. This minimum value is also a function of the position, weight, type and tire characteristics of the principal axle.

It is on this basis that in the preferred embodiments the weight on the front steering axle is measured and used as a basic consideration in deciding on the weight to be carried by the auxiliary axle.

Projecting Axle Loads

With a fixed-bed vehicle carrying a load the center of gravity, which has been determined, it is possible to calculate the total loads on one axle, without measuring it directly, based on the measured weight obtained from all of the other axles. When the load on more than one axle is unknown, or where the center of gravity is unknown, it is not possible to calculate the absolute loads on the unknown axle.

However, when the auxiliary axle is loaded by a given incremental amount, using the known geometry of the positions of the auxiliary and other axles, the corresponding effects on such axles can be determined.

Suspension of Control System

The control system is automatically suspended and the auxiliary axle unloaded, if down, when the vehicle is put into reverse. Once put into reverse the system remains suspended for one minute after reverse is disengaged. This allows the vehicle to be rocked.

An auxiliary input is provided by which the axle will be unloaded and the control system suspended while external activities are occurring. These include, for example, the compaction of the garbage or operation of a boom.

System Interlocks

In order to ensure that the system is not being subverted by an operator the apparently automatic suspension of system operation, if the vehicle is moving and a "reverse" indication has been received by the control system for over 5 to 15 minutes, then suspension of the operation of the input is terminated.

Similarly, the auxiliary input must not remain "on" for more than 15 minutes while the vehicle is in motion. If this occurs the suspension of the operation of the input is terminated.

The control system's operation may be suspended manually by operating a switch in the vehicle cab. The switch must remain on for over ½ second to reject stray electrical surges. If the manual switch suspending operation is activated for over 15 seconds the control system is disabled until a "factory reset" is effected. This may be at the vehicle's terminal.

Emergency Responses

The control system performs a number of validation procedures, and carries-out emergency responses in certain circumstances.

The axle loads are checked regularly for a serious overload condition, i.e. over 30% overload. If this is detected, an error in the control system is presumed and the "fail-safe" mode is adopted. That is, if the axle is down, it is unloaded. Monitoring continues and if this exceptional state ceases, then control resumes.

The ratio between the measured loads on the left and right front air springs is compared. If this exceeds 2:1 (and air pressure is over a minimum level, e.g. 20 lb) then the computer suspends intervention.

If the axle loads are over 20% outside their set-point targets, as determined by the last average value from a sample set, then corrective action is taken immediately, without waiting for a second sampling set.

These procedures ensure that serious conditions are dealt with appropriately, when they arise.

Control System

The control system 30 used in the preferred embodiment is based on a Omron (Trade Mark) C-28K CDRA programmable controller. It is wired to provide electrical controls to the various valves and indicators in the operators cab.

This controller may be programmed by installing an EPROM, or by transferring the program to the RAM within the controller. One of the further inputs is the geometry, weight, etc. of the vehicle.

Figure 7A:
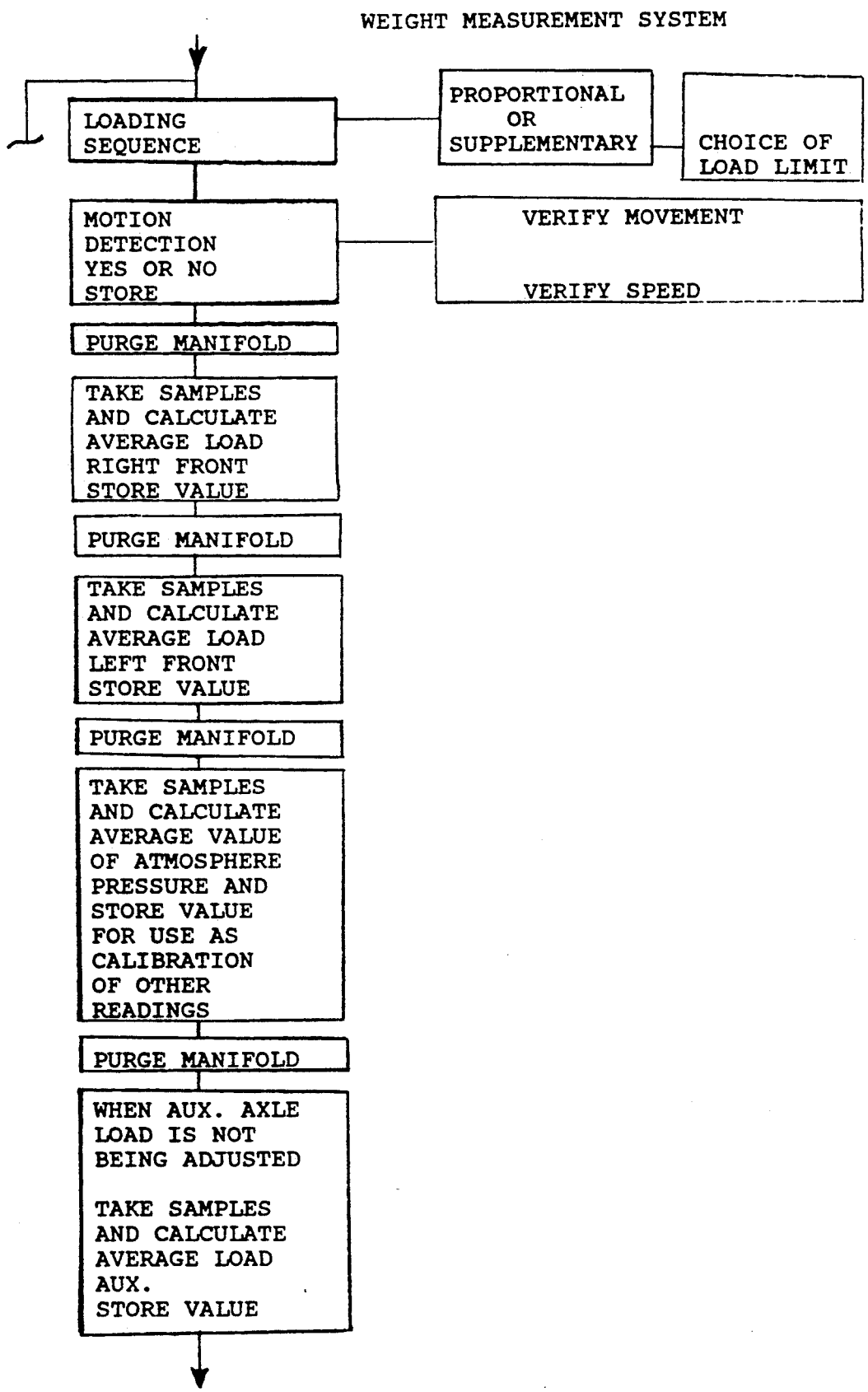
Figure 7B:
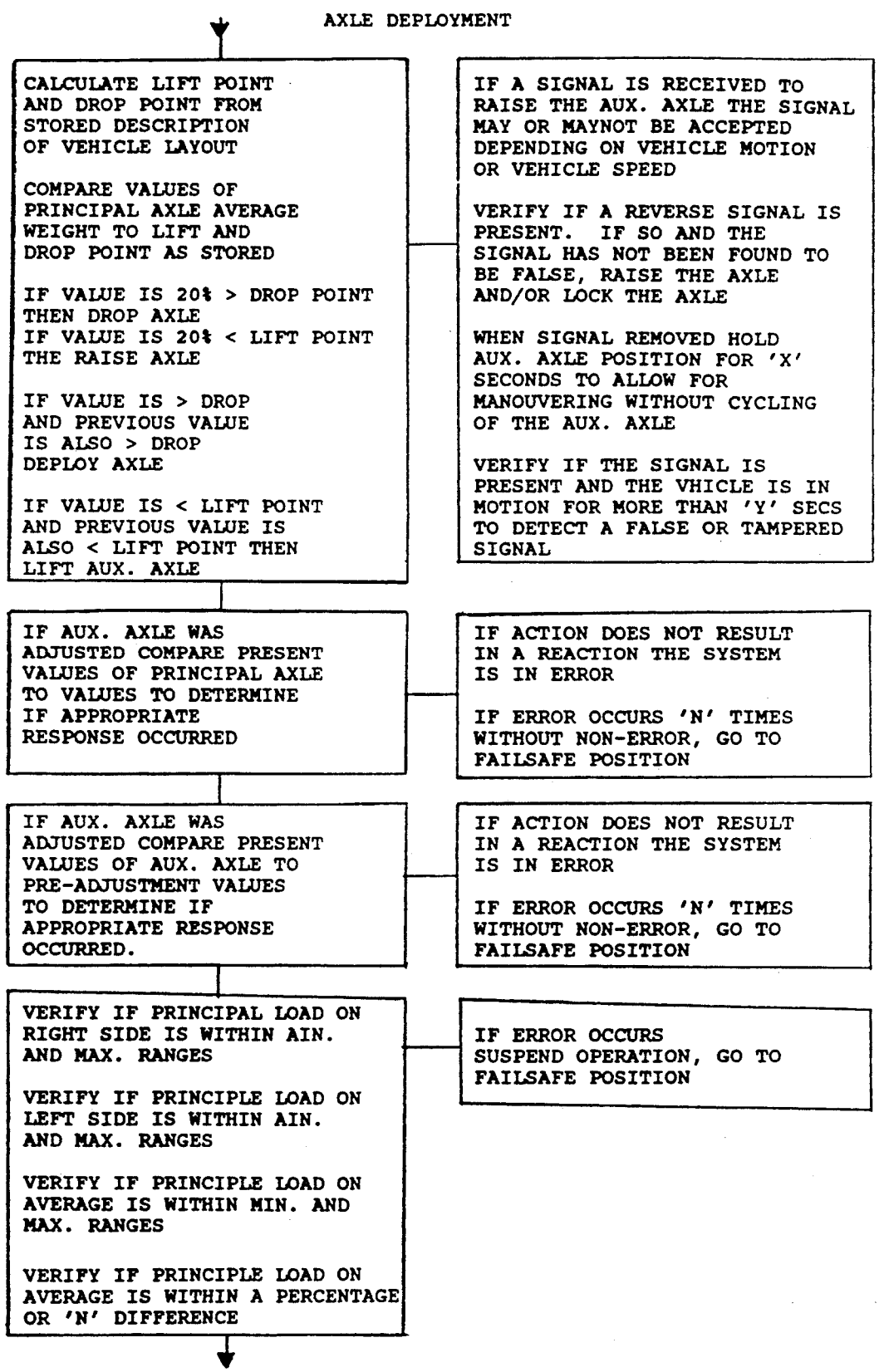

Then program installed follows the logic flow of FIG. 7 cyclically, operating on a real-time basis.

As well, the analogue signal from the pressure detector is digitized in the preferred embodiment by an Omeron (tm) ClK AD—analogue to digital converter.

Other

Axle loads can equivalently be determined based on knowing the precise weight of the vehicle, its cargo and the locations of those masses in respect to the wheels.

The pressure transducer described can be replaced by a pair of pressure switches capable of variable settings. By setting the pressure controls on the respective switches to the lift and drop points, and sampling the number of events by which the switches are activated, the average pressure can be determined with reference to either pressure switch. This can be done by comparing the number of events that are counted.

Conclusion

The foregoing constitutes a description of a series of embodiments of the invention. These are exemplary only. The invention in its broadest and more particular aspects is further described and defined in the claims which now follow.

The embodiments of the invention in which an exclusive property is claimed are as follows:

1. In a control system for deploying or applying load to an auxiliary axle on a wheeled vehicle having a chassis frame, said frame being mounted through axle suspension means on at least two non-deployable axles, at least one of said non-deployable axles serving as a principal axle from which the load on said principal axle is measured and the total vehicle load is determined, said vehicle having further an auxiliary axle, wherein:
    (a) said auxiliary axle is coupled to the chassis frame by an adjustable auxiliary axle suspension that permits such axle to be retracted to an inactive, raised position out of contact with the ground, and to be deployed by being lowered to a load-bearing position in contact with the ground; and wherein
    (b) said adjustable suspension is capable of deploying said auxiliary axle in a controlled manner so as to share a variable proportion of the total load of the vehicle being carried by all of its axles;
   said vehicle further comprising:
    (c) load sensing means for providing on a repetitive basis over time, while said vehicle is in motion, in the form of load signals, sample measurements of the momentary load carried by the principal axle;
    (d) first control means for deploying said auxiliary axle when the load on said principal axle as determined from said load sensing means is above a predetermined drop-point value;
    (e) second control means for retracting said auxiliary axle when the load on said principal axle as determined by said load sensing means is below a predetermined lift-point value;
    (f) third control means for controlling, in response to said load signals, the load carried by the auxiliary axle once it is deployed;
   the improvement comprising:
    (g) fourth control means connected to receive said load signals from said load sensing means and connected to said first, second and third control means for activation of at least one of said first, second or third control means by sending thereto an activation signal derived by processing said load signals by the comparison by said fourth control means of:
(i) a time-averaged value for a series of sample load signals taken while said vehicle is in motion; with
(ii) predetermined load signal values provided to said fourth control means for effecting actuation of said first, second and third control means.

2. A control system as in claim 1 wherein said fourth control means, before activation of the first or third control means to deploy or load the auxiliary axle, divides the signals receives from said sensing means into two consecutive sample sets of measurements and responds to the trend of change between such sample sets by:
(a) comparing the direction of that trend to a direction anticipated if the auxiliary axle were responding correctly to said activation signal, and
(b) then suspending said activation signal if the direction of the trend and anticipated direction for said trend are not the same.

3. A control system as in claim 1 wherein said fourth control means divides the signals received from said sensing means into repeated series of first and second consecutive sample sets of measurements and normally sends an activation signal to said first or third control means to deploy or load the auxiliary axle on the basis of the combined averaged value of both said first and second consecutive sample sets of measurements, thereby establishing a normal response time; but sends such activation signal based on the averaged value of only the first sample set of measurements in a shortened response time that is less than normal response time, when the average load determined from said first sample set differs from the average load determined by said second sample set by a ratio that exceeds a predetermined ratio threshold that established the requirements for said shortened response time to be applied.

4. A control system as claim 1 wherein said auxiliary axle suspension comprises air springs means that is fed with air or is bled of air in response to said third control means wherein and said fourth control means operates by sending an activation signal to said third control means to effect feeding or bleeding of air from said air springs means in discrete metered amounts that approximate the amounts appropriate to achieve a condition where the fourth control means will cease sending said activation signal to said third control means.

5. A control system as in claim 1 comprising auxiliary axle load sensing means for determining the load carried by the auxiliary axle, wherein said fourth control means is provided with a value for the maximum permitted load on said principal axle and further comprising selection means connected to said fourth control means whereby the proportion of the total vehicle load to be carried by said auxiliary axle is established either on the basis that:
(a) said auxiliary axle carries only the supplemental load necessary to ensure that the load on the principal axle does not exceed said maximum permitted load; or on the basis that:
(b) said auxiliary axle carries a load that is proportional to the load on said principal axle.

6. A control system as in claim 1 wherein said axle suspension means comprises an air spring means located over the said principal axle, said load sensing means comprises a pressure detector coupled to said air spring means whereby the pressure therein may be detected, and wherein said pressure detector is alternately coupled to a source of standard pressure, calibration means being provided whereby the accuracy of the pressure detector in measuring air spring pressure is verified by said fourth control means by alternately taking measurements of the standard pressure, comparing consecutive values of said standard pressure measurements to verify that they remain substantially constant, and wherein said fourth control means suspends activation of said first or third control means when said standard pressure values differ from each other by a predetermined amount.

7. A control system as in claim 1 comprising respective air spring located at the respective ends of said principal axle, wherein said load sensing means comprises a single pressure detector coupled to both of said air springs and said load sensing means provides alternate measurement signals to said fourth control means derived alternately from the air springs located at the respective ends of said principal axle, and said fourth means establishes said activation signal on the basis of the time-averaged value of said alternate measurement signals.

8. A control system as in claim 1 wherein said fourth control means will not function to send an activation signal for said third control means to load said auxiliary axle with a load which is above a predetermined auxiliary upper load limit.

9. A control system as in claim 1 wherein said fourth control means will not function to send an activation signal for said third control means to load said auxiliary axle with a load which is below a predetermined auxiliary axle lower load limit.

10. A control system as in claim 1 wherein said fourth control means comprises retraction limiting means that inhibits the transmission to said second control means of an activation signal for retraction of the auxiliary axle when the projected load on the principal axle, after retraction of the auxiliary axle, would place the load on said principal axle above the drop-point value.

11. A control system as in claim 1 wherein said fourth control means comprises deployment limiting means that inhibits the transmission to said first control means of an activation signal for deployment of the auxiliary axle when the projected load on the principal axle, after deployment of the auxiliary axle, would place the load on said principal axle below the lift-point value.

12. A control system as in claim 1 comprising reverse motion detection means connected to said fourth control means whereby, upon reverse motion of the vehicle, said fourth control means sends an activation signal to said second control means to effect retraction of said auxiliary axle.

13. A control system as in claim 1 comprising reverse motion detection means connected to said fourth control means whereby, upon reverse motion of the vehicle, said fourth control means sends an activation signal to said second control means to effect retraction of said auxiliary axle, and the activation of said first and third control means by said fourth control means is thereafter suspended while the vehicle remains in reverse.

14. A control system as in claims 12 or 13 wherein upon the termination of receipt by the fourth control means of an indication of reverse motion, said fourth control means delays for predetermined period of the time before sending an activation signal to said first control means for deployment of said auxiliary axle so that in maneuvering in and out of reverse, the axle deployment system does not cycle up and down.

15. A control system as in claim 1 comprising vehicle speed detection means connected to provide a vehicle speed indication to said fourth control means wherein said fourth control means accepts the series of measurements received from said sensing means by processing them in sets taken over a sampling period and said sampling period is varied in length in accordance to said vehicle speed indication as received by said fourth control means.

16. A control system as in claim 15 wherein said fourth control means comprises stopped-time detection means whereby, takes a measure of time when the vehicle is not in motion and only varies the length of said sampling period after the vehicle has ceased to be in motion for a predetermined period of time.

17. A control system as in claim 16 wherein the length of said sampling period is shortened by said fourth control means upon its reception of positive vehicle speed indications within a predetermined start-up time period following receipt of a signal that said vehicle is not in motion.

18. A control system as in claim 1 wherein said vehicle comprises brakes and braking detection means connected to send a braking signal to said fourth control means when said brakes are activated, and said fourth control means comprises a response inhibition means whereby, upon receipt of a braking signal, said fourth control means in inhibited for a predetermined period of time from sending activation signals to said first, second or third control means.

19. A control system as in claim 1 comprising manual override means connected to send an override signal to said fourth control means whereby an operator may manually override and reversibly disable said fourth control means; and further incorporating subversion detection means whereby, if said manual override means is engaged for more than a predetermined period of time while the vehicle is moving, said fourth control means is irreversibly disabled in order to deter subversion of the control system.

20. A control system as in claim 19 comprising manual override limitation means connected to said manual override means to prevent transmission of an override signal to said fourth control means when the vehicle is in motion or the vehicle speed is above a predetermined limit, thereby preventing the operator from subverting the general operation of the control system.

21. A control system as in claim 1 wherein said fourth control means is provided with values for the maximum and minimum permitted loads on said principal axle, and said fourth control means, upon receiving signals from said sensing means indicating that the load on said principal axle is above said maximum permitted load value, or below said minimum permitted load value, responds by sending a disabling signal to said third control means to reduce the proportion of load to be carried by said auxiliary axle to zero or a near zero value.

22. A control system as in claim 21 wherein, upon transmission of said disabling signal to said third control means, said fourth control means sends a lift signal to said second control means to effect retraction of said auxiliary axle.

23. A control system as in claim 22 comprising manual switch means connected to said fourth control means whereby, upon activation of said switch, said fourth control means upon receiving signals from said sensing means indicating that the load on said principal axle is between said maximum and minimum permitted load values, ceases to send said disabling and lift signals and sends a redeployment signal to said first control means, and a loading signal to said third control means.

24. A control system as in claim 22 comprising manual switch means connected to said fourth control means whereby said manual switch must first be activated before said fourth control means will send said activation signals to said first or third control means for redeployment and loading of said auxiliary axle.

* * * * *